US012640139B2

(12) United States Patent
Kim et al.

(10) Patent No.: US 12,640,139 B2
(45) Date of Patent: May 26, 2026

(54) METHOD AND APPARATUS FOR IMPROVING PERFORMANCE OF ARTIFICIAL INTELLIGENCE MODEL USING SPEECH RECOGNITION RESULTS AS TEXT INPUT WITH DELAY TIMES

(71) Applicant: ELECTRONICS AND TELECOMMUNICATIONS RESEARCH INSTITUTE, Daejeon (KR)

(72) Inventors: Seung Hi Kim, Daejeon (KR); Jeong Uk Bang, Daejeon (KR); Seung Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 133 days.

(21) Appl. No.: 18/585,204

(22) Filed: Feb. 23, 2024

(65) Prior Publication Data

US 2024/0420682 A1     Dec. 19, 2024

(30) Foreign Application Priority Data

Jun. 15, 2023     (KR) ........................ 10-2023-0077050

(51) Int. Cl.
   *G10L 15/06*          (2013.01)
   *G10L 15/26*          (2006.01)
(52) U.S. Cl.
   CPC ............ *G10L 15/063* (2013.01); *G10L 15/26*
      (2013.01); *G10L 2015/0631* (2013.01)
(58) Field of Classification Search
   CPC ........... G10L 15/063; G10L 2015/0631; G10L
      15/20; G10L 15/26; G10L 15/30
      (Continued)

(56) References Cited

U.S. PATENT DOCUMENTS 6,151,574 A * 11/2000 Lee ........................ G10L 15/144
                                                         704/E15.009
9,613,624 B1 *  4/2017 Kramer ................... G10L 15/08
                           (Continued)

FOREIGN PATENT DOCUMENTS

JP              6578049 B2     9/2019
KR     10-2022-0112596 A      8/2022
KR          10-2504445 B1     3/2023

OTHER PUBLICATIONS

Nguyen, et al. "Super-human performance in online low-latency recognition of conversational speech." arXiv preprint arXiv:2010. 03449, Jul. 2021, pp. 1-5. (Year: 2021).*

(Continued)

*Primary Examiner* — James S Wozniak
(74) *Attorney, Agent, or Firm* — LRK PATENT LAW FIRM

(57)          ABSTRACT

The present disclosure relates to a method and device for improving the performance of an AI model that uses voice recognition results as text input. A method of training an AI model according to an embodiment of the present disclosure may include: generating first time information on a plurality of words included in a voice and transcription, using a first learning sample including the voice and the transcription; generating second time information by adding a pre-configured delay time to the first time information; generating a modified transcription based on an end time of a last word among the plurality of words and the second time information; and performing training of the AI model based on a second training sample including the voice and the modified transcription.

20 Claims, 6 Drawing Sheets

(58) Field of Classification Search
USPC ........................................ 704/232, 235, 243
See application file for complete search history.

(56) References Cited

U.S. PATENT DOCUMENTS

| | | | |
|---|---|---|---|
| 9,697,201 B2 | 7/2017 | Gao et al. | |
| 12,190,871 B1 * | 1/2025 | Siagian | G06Q 30/0277 |
| 2018/0366120 A1 * | 12/2018 | Ushio | G10L 15/24 |
| 2020/0027444 A1 * | 1/2020 | Prabhavalkar | G10L 15/02 |
| 2020/0075033 A1 * | 3/2020 | Hijazi | G06N 3/086 |
| 2020/0357388 A1 * | 11/2020 | Zhao | G06N 3/08 |
| 2021/0118449 A1 * | 4/2021 | Kim | G10L 15/16 |
| 2021/0264921 A1 * | 8/2021 | Reece | G06F 40/35 |
| 2022/0189461 A1 * | 6/2022 | Zhao | G10L 15/19 |
| 2022/0351720 A1 * | 11/2022 | Alon | G10L 15/083 |
| 2023/0061505 A1 | 3/2023 | Oh et al. | |
| 2023/0162737 A1 | 5/2023 | Kirkpatrick et al. | |
| 2023/0267919 A1 * | 8/2023 | Ponçot | G10L 15/22 |
| | | | 704/251 |
| 2024/0062744 A1 * | 2/2024 | Liu | G10L 15/16 |
| 2024/0087596 A1 * | 3/2024 | Nandwana | G10L 25/63 |
| 2024/0347042 A1 * | 10/2024 | Weninger | G10L 15/063 |
| 2024/0347047 A1 * | 10/2024 | Weninger | G10L 15/28 |
| 2024/0395246 A1 * | 11/2024 | Mcquinn | G10L 13/02 |
| 2024/0404512 A1 * | 12/2024 | Yu | G10L 15/083 |

OTHER PUBLICATIONS

Shangguan, Yuan, et al. "Dissecting user-perceived latency of on-device E2E speech recognition." arXiv preprint arXiv:2104. 02207, Aug. 2021, pp. 1-5. (Year: 2021).*

Amalia Istiqlali Adiba et al., "Towards Immediate Backchannel Generation Using Attention-Based Early Prediction Model", ICASSP 2021—2021 IEEE International Conference on Acoustics, Speech and Signal Processing.

Ricardo Falcon-Perez, "Curriculum Learning With Audio Domain Data Augmentation for Sound Event Localization and Detection", Detection and Classification of Acoustic Scenes and Events 2022.

Daniel S. Park et al., "SpecAugment: A Simple Data Augmentation Method for Automatic Speech Recognition", arXiv:1904.08779v3 [eess.AS] Dec. 3, 2019.

* cited by examiner

METHOD AND APPARATUS FOR IMPROVING PERFORMANCE OF ARTIFICIAL INTELLIGENCE MODEL USING SPEECH RECOGNITION RESULTS AS TEXT INPUT WITH DELAY TIMES

CROSS-REFERENCE TO RELATED APPLICATION(S)

This application claims the benefit of earlier filing date and right of priority to Korean Application No. 10-2023-0077050, filed on Jun. 15, 2023, the contents of which are all hereby incorporated by reference herein in their entirety.

BACKGROUND

1. Technical Field

The present disclosure relates to artificial intelligence and machine learning, more specifically, it relates to a method and apparatus used in the field of artificial intelligence or machine learning that use voice recognition results as text input, or multimodal input that uses audio or video together.

2. Description of Related Art

There are artificial intelligence technology fields and models that use voice recognition results as text input. A representative example may be an artificial intelligence agent capable of voice-based conversation. In addition, research on conversation models that may communicate with humans has recently become active, and the ability to use a back channel well is considered a necessary function for interactive conversation. Herein, text is one of the important sources of information for backchannel management.

In linguistics, the front channel refers to a case where the speaker has control of the conversation. For example, starting a story, changing the topic, asking a question, or giving an answer corresponds to the front channel. On the other hand, backchannel refers to a short speech or gesture made by the listener to indicate that he or she is participating in the conversation. This may refer to a short vocalization, facial expression, eye gesture, head movement, or a combination of these used by the listener to indicate that the listener is paying attention to the speaker, or to ask the speaker to continue speaking. By using the backchannel, listeners may express that they are focused on the conversation. For example, there is a back channel expressed through voice information such as 'yes', 'okay', and 'aha', and a back channel expressed through actions such as smiling and nodding. Backchannels serve to maintain the flow of conversation and promote mutual understanding.

The artificial intelligence agent needs to use the appropriate type of backchannel at the appropriate time while listening to the speaker. Technically, audio and text signals from the speaker's voice and visual signals from the speaker's behavior are used as inputs to the backchannel prediction model to predict the timing and type of backchannel use and use of the backchannel (e.g., speakers, screen, robot behavior). Because it needs to understand what the speaker is saying in order to use sophisticated and diverse back channels well, it is necessary to utilize the linguistic information contained in the speaker's voice, that is, the text. In addition, even if the prediction of the type of backchannel is appropriate, if the timing of using the backchannel is not appropriate, it may interfere with people's immersion in the conversation. The model shall be good at predicting when to use backchannels, but responsiveness, that is, the model's ability to use backchannels at the right time, is also very important.

SUMMARY

The technical object of the present disclosure is to provide a method and apparatus to solve the problem of deteriorating model performance as the distribution of model input differs from the distribution of input during the training process due to the delay time until the voice recognition result is output in the actual operation process, in an artificial intelligence system that uses voice recognition results as text and multimodal input.

The technical objects to be achieved by the present disclosure are not limited to the above-described technical objects, and other technical objects which are not described herein will be clearly understood by those skilled in the pertinent art from the following description.

A method of training an artificial intelligence (AI) model according to an aspect of the present disclosure may comprise: generating first time information on a plurality of words included in a voice and transcription, using a first learning sample including the voice and the transcription; generating second time information by adding a pre-configured delay time to the first time information; generating a modified transcription based on an end time of a last word among the plurality of words and the second time information; and performing training of the AI model based on a second training sample including the voice and the modified transcription. Herein, the pre-configured delay time may be variably adjusted depending on a degree of the training.

An apparatus for training an artificial intelligence (AI) model according to an additional aspect of the present disclosure may comprise a processor and a memory, and the processor may be configured to: generate first time information on a plurality of words included in a voice and transcription, using a first learning sample including the voice and the transcription; generate second time information by adding a pre-configured delay time to the first time information; generate a modified transcription based on an end time of a last word among the plurality of words and the second time information; and perform training of the AI model based on a second training sample including the voice and the modified transcription. Herein, the pre-configured delay time may be variably adjusted depending on a degree of the training.

As one or more non-transitory computer readable medium storing one or more instructions according to an additional aspect of the present disclosure, the one or more instructions may be executed by one or more processors and control an apparatus for training an artificial intelligence (AI) model to: generate first time information on a plurality of words included in a voice and transcription, using a first learning sample including the voice and the transcription; generate second time information by adding a pre-configured delay time to the first time information; generate a modified transcription based on an end time of a last word among the plurality of words and the second time information; and perform training of the AI model based on a second training sample including the voice and the modified transcription. Herein, the pre-configured delay time may be variably adjusted depending on a degree of the training.

In various aspects of the present disclosure, the pre-configured delay time maybe related to a delay time for text output of a voice recognizer.

Additionally, in various aspects of the present disclosure, the first time information may include information on an end time for each word for the plurality of words. In this regard, the second time information may be generated by adding the pre-configured delay time to an end time of each word for the plurality of words.

Additionally, in various aspects of the present disclosure, the modified transcription may be generated by removing one or more words from among the plurality of words whose end time for each word is greater than or equal to the end time based on the second time information.

Additionally, in various aspects of the present disclosure, the pre-configured delay time may be set to a value of 0 in an initial section of the training.

Additionally, in various aspects of the present disclosure, the pre-configured delay time may be set between a 0 value and a maximum delay time value in a section where the training exceeds a pre-determined training stage.

Additionally, in various aspects of the present disclosure, the pre-configured delay time may be set between a minimum delay time value and a maximum delay time value in a section where the training exceeds a pre-determined training stage.

Additionally, in various aspects of the present disclosure, the pre-configured delay time may be set to gradually increase up to a delay time of the voice recognizer as a stage of training increases.

According to the present disclosure, in an artificial intelligence system that receives voice recognition results as text and must respond quickly, the performance of the system may be improved by resolving the mismatch problem between learning and operation input data.

Effects achievable by the present disclosure are not limited to the above-described effects, and other effects which are not described herein may be clearly understood by those skilled in the pertinent art from the following description.

DETAILED DESCRIPTION

Figure 1:
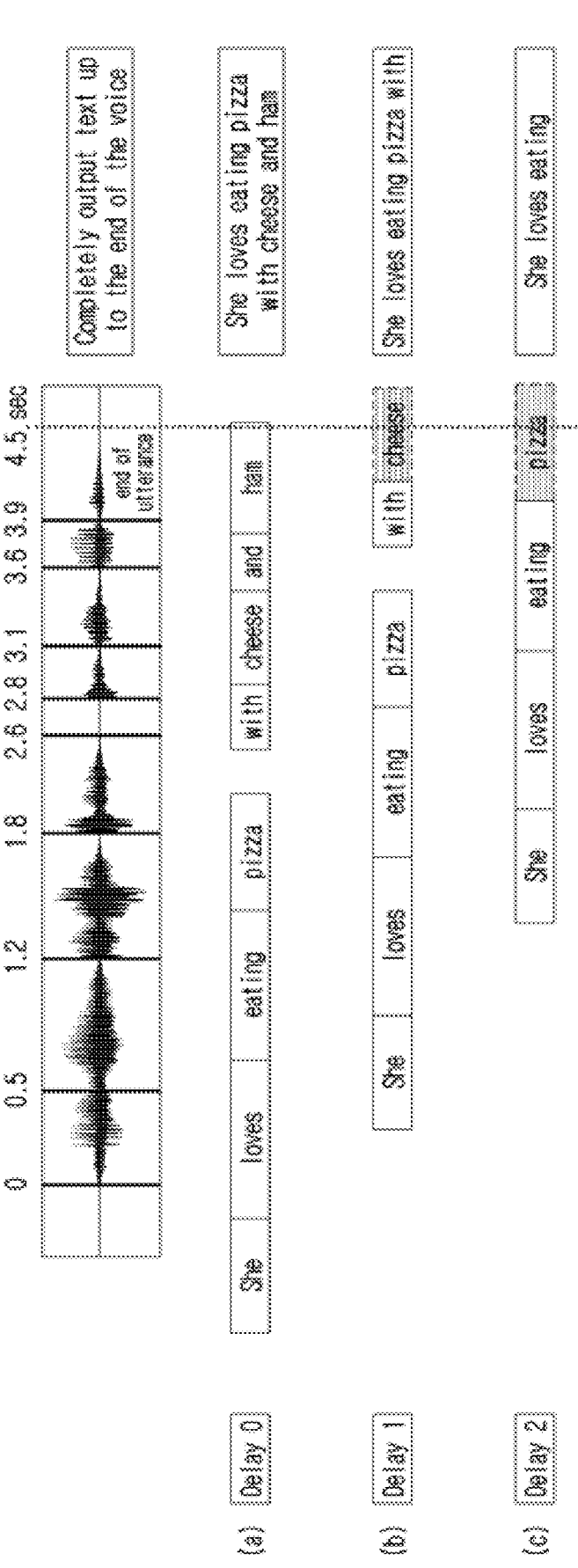
FIG. 1 illustrates text output based on the output delay of a voice recognition device applicable to the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An artificial intelligence/machine learning model for using a back channel based on the speaker's voice and/or behavior, such as an artificial intelligence agent, may be considered.

In this regard, in the stage of training the model, a transcript for audio (i.e., voice) may be used as text input. At this time, the voice up to the point at which the prediction needs to be made (i.e., the current time) and the transcription up to that part may be used as a data sample for training the model.

On the other hand, when an artificial intelligence agent carries out a conversation with a real person using a trained model, the output of a speech recognizer for input audio (e.g., the speaker's voice) may be used as text input. In this case, there may be a delay until the voice recognizer outputs, and, accordingly, the distribution of voice and text in the actual conversation process may be different from the distribution in the training process.

FIG. 1 illustrates text output based on the output delay of a voice recognition device applicable to the present disclosure.

FIG. 1A illustrates a case where the delay time of the voice recognizer during the operation process is 0.0 seconds, that is, there is no output delay of the voice recognizer.

In this case, the entire voice of the sample and the entire corresponding transcript, that is, "She loves eating pizza with cheese and ham," are used as input to the model. One sample may be constructed during the training process.

FIG. 1B illustrates a case where the delay time of the voice recognizer during the operation process is 1.0 seconds.

When using complete text that may be secured at the end of utterance for the artificial intelligence agent to respond quickly, "She loves eating pizza with" needs to be used as the text input. At this time, "cheese" may not be used as a text input because it is not yet output at the end of the utterance.

FIG. 1C illustrates a case where the delay time of the voice recognizer during operation is 2.0 seconds.

When using complete text that may be secured at the moment voice input ends for the artificial intelligence agent's quick response, "She loves eating" needs to be used as the text input. At this time, "pizza" may not be used as a text input because it is not yet output at the end of the utterance.

As a result, for the same voice, while "She loves eating pizza with cheese and ham" is used as text input in the learning process, in the actual operation process, "She loves eating" is used as text input. In other words, a mismatch in data distribution occurs during the training process and the actual operation process.

Inconsistencies as described above may degrade the performance of the artificial intelligence model. In other words, if the distribution of text that may be secured at the present time changes during the learning process and operation process due to the processing time of the voice recognizer, problems may arise that reduce model performance.

For example, when a conversation system that communicates with real people uses a back channel to perform a natural conversation, the system needs to respond immediately to human utterances. To achieve this, the system needs to generate a back channel output using only the voice and text (i.e., "She loves eating") available at the current time.

When waiting until the complete recognition result is output to remove the inconsistency as described above, the generation time of the back channel signal may also be delayed (e.g., 1.0 seconds or 2.0 seconds as shown in FIG. 1). In other words, the back channel signal that the artificial intelligence agent shall output immediately after the current voice is completed may be output after a certain period of time due to the delay time of the voice recognizer.

Accordingly, problems that cause unnatural conversations between artificial intelligence agents and real people may occur.

In order to solve the above-mentioned problems, the present disclosure proposes a method that reflects the delay time of an actual voice recognizer, when constructing text used as input for a training process.

Additionally, in order to improve the training efficiency and/or accuracy of the model, a method to variably adjust the delay time to be reflected in text composition depending on the degree of learning is proposed in the present disclosure. Specifically, a method that sets the delay time to 0 at the beginning of training, increases the delay time according to the progress of training, and reflects the delay time of the actual voice recognizer in the later stages of training is proposed in the present disclosure.

The method proposed in the present disclosure differs from existing technologies in that it configures training samples by reflecting the delay time of the actual recognizer output in the training samples of the artificial intelligence model and in that it variably adjusts the delay time to be reflected in text composition according to training information.

Figure 2:
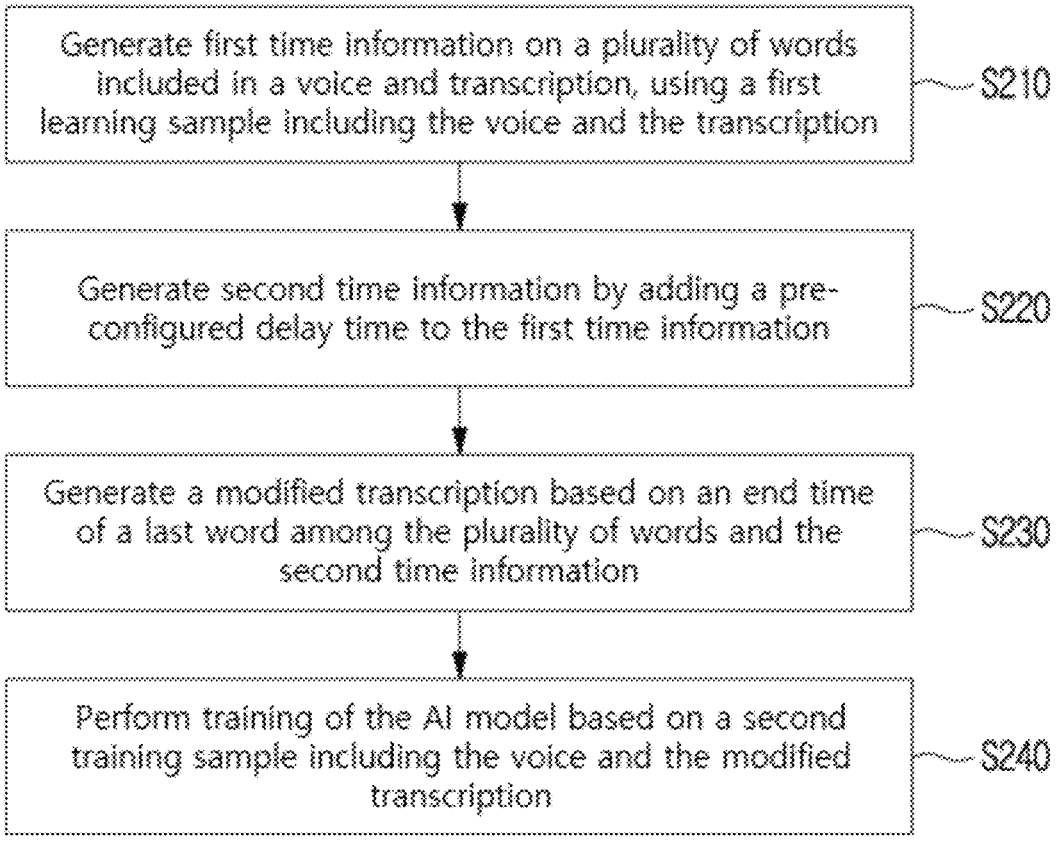
FIG. 2 illustrates an operation flowchart of a method for training an artificial intelligence model based on text input for a voice recognition result according to an embodiment of the present disclosure.

FIG. 2 illustrates an operation flowchart of a method for training an artificial intelligence model based on text input for a voice recognition result according to an embodiment of the present disclosure.

In step S210, by using a first training sample including voice and transcription, first time information for a plurality of words included in the voice and transcription may be generated.

In step S220, second time information may be generated by adding a pre-configured delay time to the first time information.

For example, the pre-configured delay time may be related to the delay time for text output of the voice recognizer.

In this regard, the first time information may include information on at least one of a start time or an end time for each word for the plurality of words. The second time information may be generated by adding the pre-configured delay time to the end time of each word for the plurality of words.

In step S230, a modified transcription may be generated based on the end time and second time information of the last word among the plurality of words.

For example, the modified transcript may be generated by removing one or more words whose end time is greater than or equal to the end time of the last word among multiple words, based on the second time information among the plurality of words.

In step S240, training of the artificial intelligence model may be performed based on the second training sample including the voice and the modified transcription.

In performing the above-described steps, the pre-configured delay time may be variably adjusted depending on the degree of training.

For example, the pre-configured delay time may be set to a value of 0 in the initial section of the training.

Additionally or alternatively, the pre-configured delay time may be set between a value of 0 and a maximum delay time value in a section where the training exceeds a predetermined training stage.

Additionally or alternatively, the pre-configured delay time may be set between a minimum delay time value and a maximum delay time value in a section where the training exceeds a pre-determined training stage.

Additionally or alternatively, the pre-configured delay time may be set to gradually increase up to the delay time of the voice recognizer as the stage of training increases.

The example of FIG. 2 may correspond to some or all of the various examples of the present disclosure. Hereinafter, various examples of the present disclosure, including the example of FIG. 2, will be described.

That is, the present disclosure proposes a specific method of reflecting the delay time of the voice recognizer for text input to be used in the model training process, below.

Figure 3:
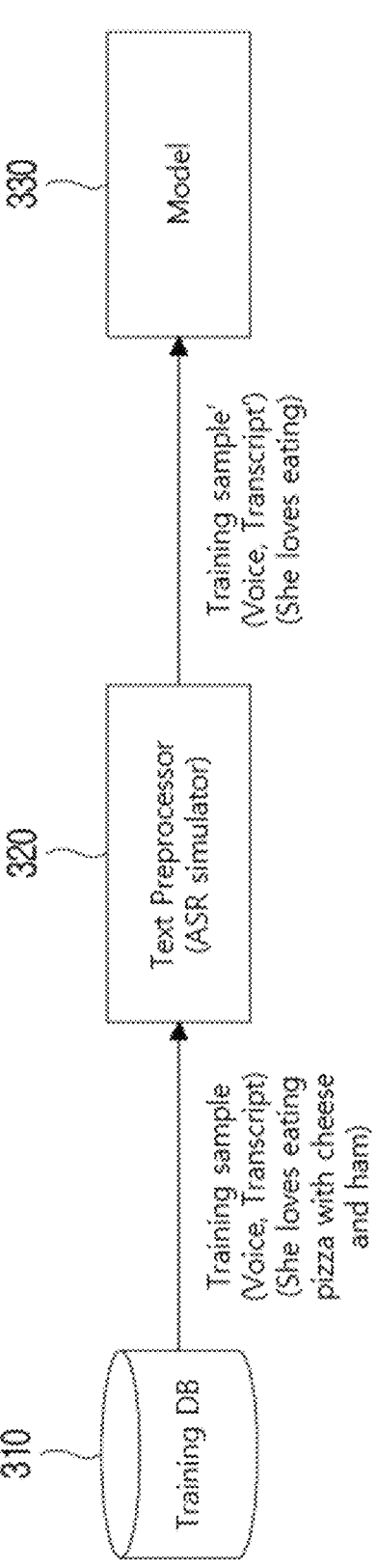
FIG. 3 illustrates a data preprocessing process in a text preprocessor according to an embodiment of the present disclosure.

FIG. 3 illustrates a data preprocessing process in a text preprocessor according to an embodiment of the present disclosure.

Referring to FIG. 3, in the data preprocessing process, a text preprocessor 320 that generates/applies an output delay effect of the voice recognition result may be used.

One or more (e.g., N, where N is an integer greater than or equal to 1) training samples may be extracted from the training database (DB) 310. As an example, a training sample may include a voice and a transcript related to the voice.

The extracted training samples may be input to the text preprocessor 320, which simulates the output delay effect of the voice recognizer.

For example, if the transcription input to the text preprocessor 320 is "She loves eating pizza with cheese and ham," the text preprocessor 320 may output "She loves eating" by assuming a delay of about 2 seconds In this regard, as shown in FIG. 1, for the voice (i.e., audio) of the training samples and the transcripts (including word-specific temporal information), as the text preprocessor 320 reflects the delay time, it may remove words whose end time is greater than the end time of the utterance (i.e., words that are completed after the end timing of the utterance).

In the case of the training sample preprocessed by the text preprocessor 320, compared to the original sample, there is no change in the voice, and only the text (i.e., transcription) is modified.

The preprocessed training sample is input to the machine learning model 330, and the model training process may be performed based on the input training sample.

Figure 4:
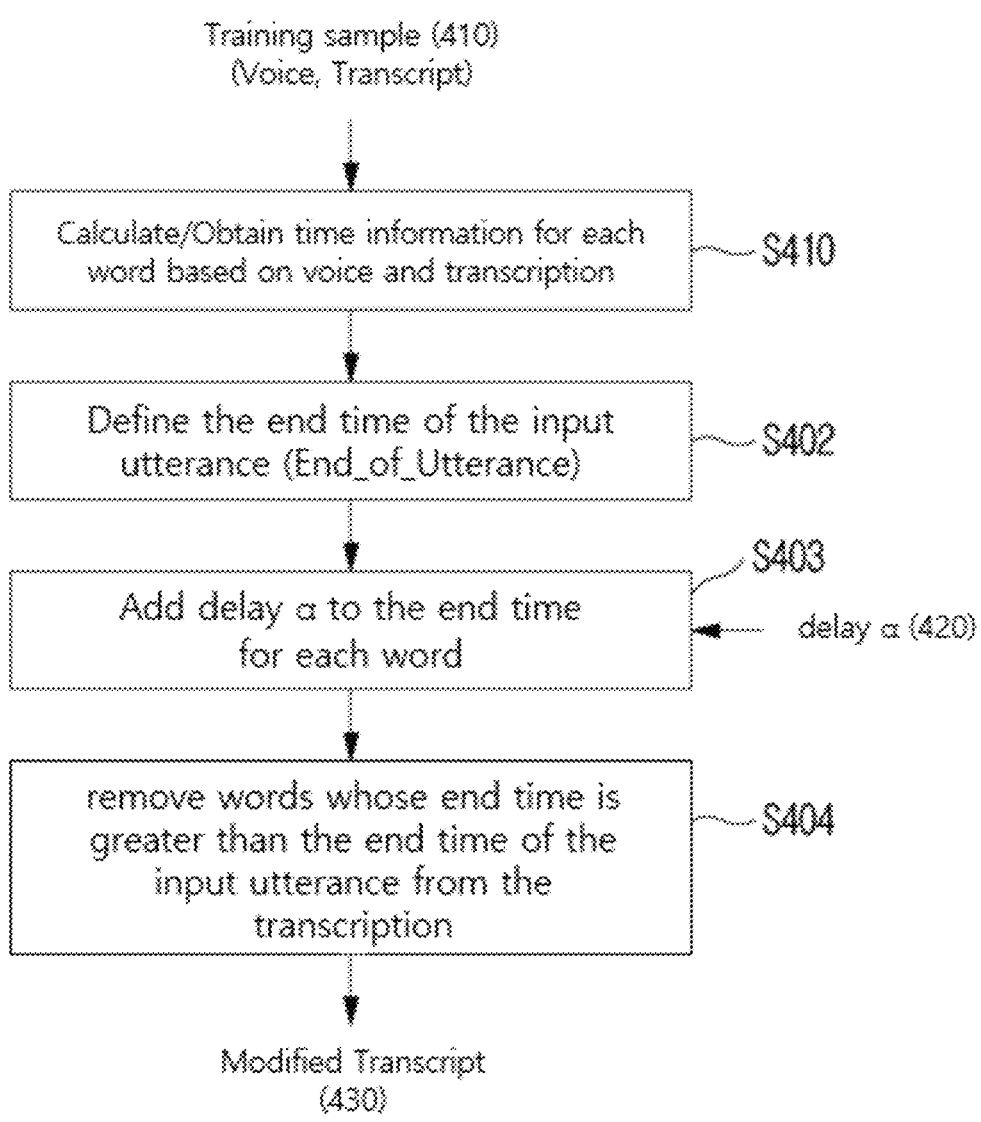
FIG. 4 illustrates a process of modifying and outputting an input transcription based on a delay time according to an embodiment of the present disclosure.

FIG. 4 illustrates a process of modifying and outputting an input transcription based on a delay time according to an embodiment of the present disclosure.

The operation described in FIG. 4 may correspond to a transcription modification operation in the text preprocessor 320. That is, the text preprocessor 320 may generate/output a modified training sample, that is, a modified transcription 430, using the training sample 410 and the delay time 420.

For example, when training samples (e.g., speech and transcription) 410 are input to the text preprocessor 320, the text preprocessor 320 may calculate/obtain time information for each word using voice and transcription (step S401).

Here, the time information for each word may mean the time at which the corresponding word ends in the voice (hereinafter referred to as the end time).

In this regard, the end time of the last word in the transcription may be defined as the end time (End_of_Utterance) of the input utterance (step S402).

Afterwards, the text preprocessor 320 may add a given delay time (delay a) 420 to the end time for each word (step S403).

For example, a case where the ending time information for each word of the transcription "She loves eating pizza with cheese and ham" is [0.5 seconds, 1.2 seconds, 1.8 seconds, 2.6 seconds, 3.1 seconds, 3.6 seconds, 3.9 seconds, 4.5 seconds] and the delay time is 2.0 seconds may be considered. In this case, the end time information for each word reflecting the delay time may be [2.5 seconds, 3.2 seconds, 3.8 seconds, 4.6 seconds, 5.1 seconds, 5.6 seconds, 5.9 seconds, 6.5 seconds].

In this example, referring to the modified end time information for each word, words longer than 4.5 seconds, the ending time of the input utterance, correspond to "pizza with cheese and ham."

The text preprocessor 320 may remove words whose end time is greater than the end time of the input utterance from the transcription (step S404).

For example, a modified transcription 430 may be generated/output by removing "pizza with cheese and ham" in the above-described example from the input transcription. In this case, the modified transcription 430 may correspond to "She loves eating."

Additionally or alternatively, in the embodiment of the present disclosure, a method in which time information for each word is calculated/obtained using voice and transcription within a text preprocessor has been described, but, alternatively, a method in which time information for each word calculated/obtained externally is used to modify the transcript may be applied.

Additionally or alternatively, in the embodiment of the present disclosure, an example of removal when the end time for each word exceeds the end time of the input utterance has been described, but, alternatively, a method in which the end time for each word is included/allowed in the modified transcript, including words that overlap with the end time of the input utterance, may be applied.

Additionally or alternatively, a time limit may be set and only the results of the voice recognizer output up to the time limit may be set to be used. In this case, there is an effect that errors in the voice recognizer may also be reflected.

In relation to the proposed method of the present disclosure described above, in order to efficiently learn a robust artificial intelligence model, a method may be used to keep the training difficulty level low in the early part of training and increase the training difficulty towards the latter part.

Figure 5:
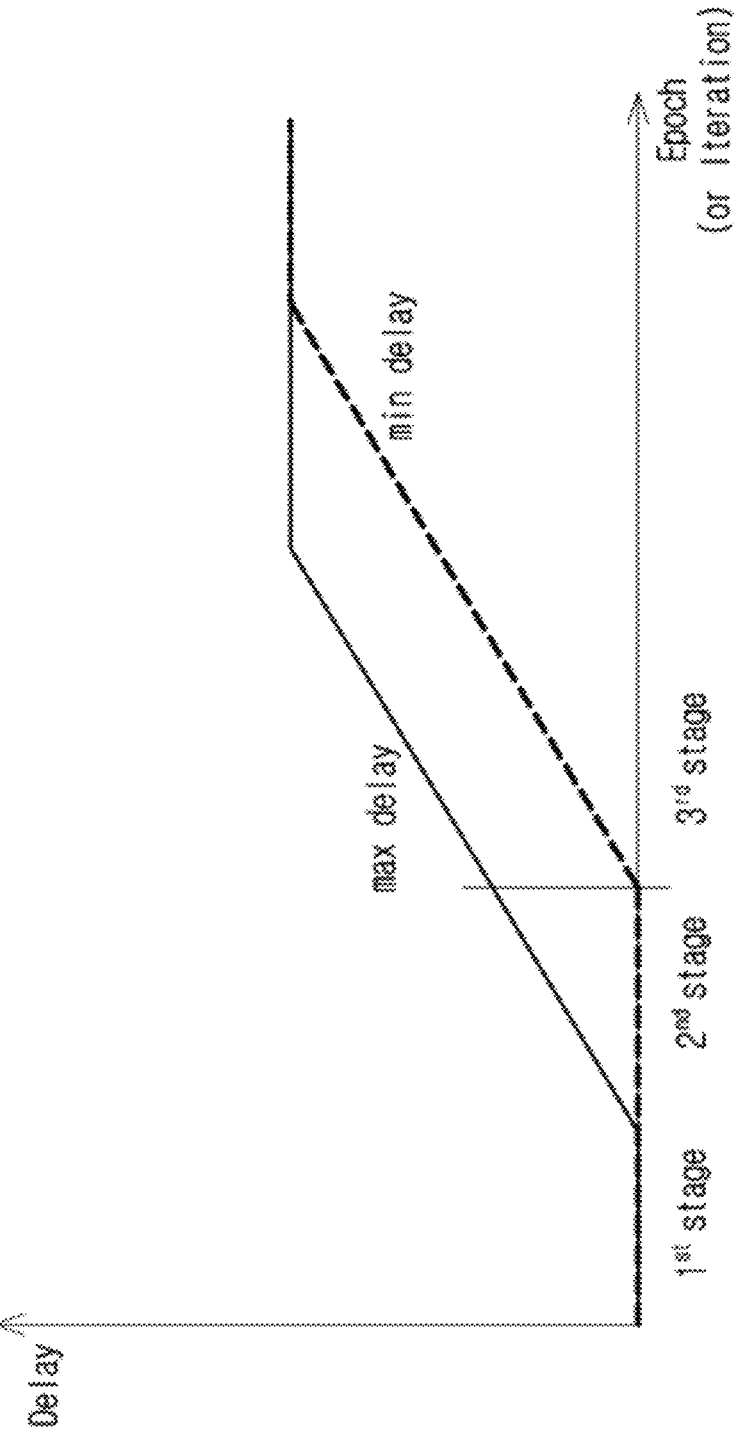
FIG. 5 illustrates a method of setting a delay time in a text preprocessor according to an embodiment of the present disclosure.

FIG. 5 illustrates a method of setting a delay time in a text preprocessor according to an embodiment of the present disclosure.

At the beginning of training (i.e., the first stage), the delay time is set to 0, and the output of voice recognition, that is, the entire transcript, is output. In this case, the entire transcript is used in the training process, and because there is a lot of information, training may proceed well.

When some training has progressed (i.e., the second stage), the delay time may be randomly extracted between a value of 0 and a maximum delay value. In this case, training using a transcript with some words deleted may be performed based on the extracted delay time.

Here, the maximum delay time value may change depending on the training stage, that is, the training progress.

Afterwards, when training progresses further (i.e., the third stage), the delay time may be randomly extracted between the minimum delay time (min delay) value and the maximum delay time (max delay) value. Even in this case, training using a transcript with some words deleted based on the extracted delay time may be performed.

Here, the minimum delay time value may change depending on the training stage, that is, the training progress.

The maximum delay time curve and minimum delay time curve in this embodiment may be defined in various ways, and the extraction range and method of delay time for each training stage may also be defined in various ways.

As an example, the first stage, second stage, and third stage in this embodiment may also be unified in that the delay time is randomly extracted between the minimum delay time value and the maximum delay time value, depending on how you define the maximum and minimum latency curves.

The proposed method described in the present disclosure is not limited to the field of backchannel prediction technology, It may be expanded and applied to the training of all artificial intelligence systems that use the output of a voice recognizer as text input.

Figure 6:
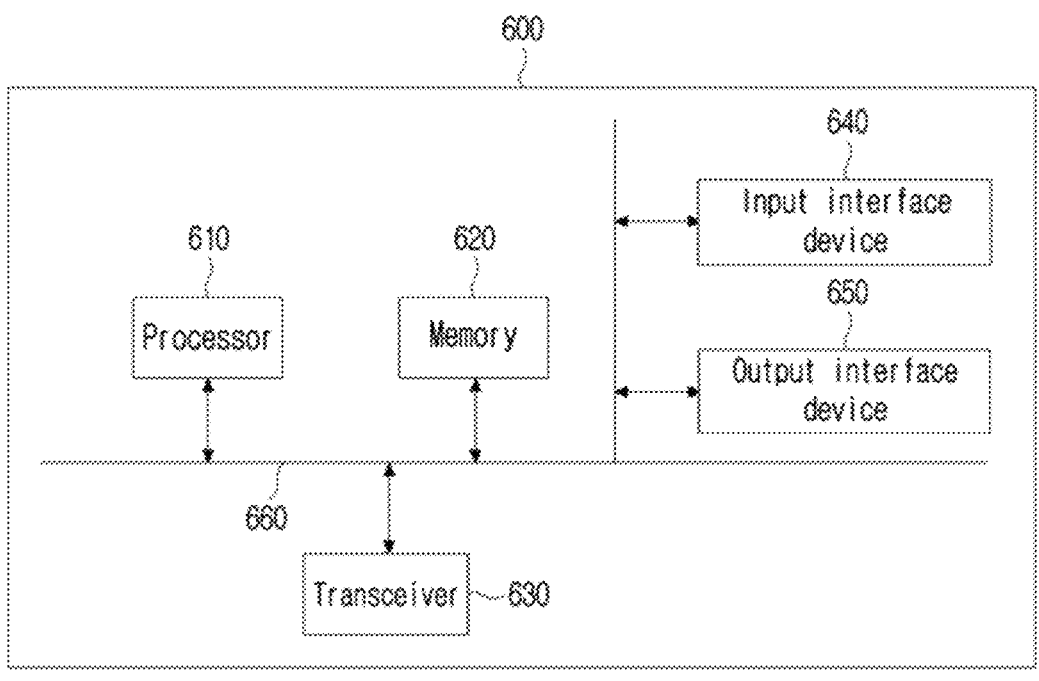
FIG. 6 is a block diagram illustrating a device according to an embodiment of the present disclosure.

FIG. 6 is a block diagram illustrating an apparatus according to an embodiment of the present disclosure.

Referring to FIG. 6, device 600 may represent a device that implements a method of reflecting the delay time of an actual voice recognizer when constructing text used as input for the training process described in the present disclosure.

For example, the device 600 may generally support/perform a function to generate a modified training sample by reflecting the delay time of the speech recognizer for the training sample, specifically, a function of calculating/obtaining time information for each word, a function to define the end time of an input utterance, a function to add delay to the end time of each word, a function to remove words with an end time greater than the end time of the input utterance from the transcript, a function to adjust the delay time to be reflected depending on the degree of training, or the like.

The device 600 may include at least one of a processor 610, a memory 620, a transceiver 630, an input interface device 640, and an output interface device 650. Each of the components may be connected by a common bus 660 to communicate with each other. In addition, each of the components may be connected through a separate interface or a separate bus centering on the processor 610 instead of the common bus 560.

The processor 610 may be implemented in various types such as an application processor (AP), a central processing unit (CPU), a graphic processing unit (GPU), etc., and may be any semiconductor device that executes a command stored in the memory 620. The processor 610 may execute a program command stored in the memory 620. The processor 610 may be configured to implement a method/device that reflects the delay time of an actual voice recognizer when constructing text used as input for the training process based on FIGS. 1 to 5 described above.

And/or, the processor 610 may store a program command for implementing at least one function for the corresponding modules in the memory 620 and may control the operation described based on FIGS. 1 to 5 to be performed.

The memory 620 may include various types of volatile or non-volatile storage media. For example, the memory 620 may include read-only memory (ROM) and random access memory (RAM). In an embodiment of the present disclosure, the memory 620 may be located inside or outside the processor 610, and the memory 620 may be connected to the processor 610 through various known means.

The transceiver 630 may perform a function of transmitting and receiving data processed/to be processed by the processor 610 with an external device and/or an external system.

The input interface device 640 is configured to provide data to the processor 610.

The output interface device 650 is configured to output data from the processor 610.

According to the present disclosure, in an artificial intelligence system that receives voice recognition results as text and must respond quickly, the performance of the system may be improved by resolving the mismatch problem between learning and operation input data.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method of training an artificial intelligence (AI) model, the method comprising:
   generating first time information on a plurality of words included in a voice and transcription, using a first learning sample including the voice and the transcription;
   generating second time information by adding a pre-configured delay time to the first time information;
   generating a modified transcription based on an end time of a last word among the plurality of words and the second time information; and
   performing training of the AI model based on a second training sample including the voice and the modified transcription,
   wherein the pre-configured delay time is progressively increased in correspondence with an advancement of a stage of the training, and
   wherein an amount of word removal for generating the modified transcription is increased in response to an increase of the pre-configured delay time.

2. The method of claim 1, wherein the pre-configured delay time is related to a delay time for text output of a voice recognizer.

3. The method of claim 1, wherein the first time information includes information on an end time for each word for the plurality of words.

4. The method of claim 3, wherein the second time information is generated by adding the pre-configured delay time to the end time for each word for the plurality of words.

5. The method of claim 1, wherein the modified transcription is generated by removing one or more words from among the plurality of words whose end time for each word is greater than or equal to the end time based on the second time information.

6. The method of claim 1, wherein the pre-configured delay time is set to a value of 0 in an initial section of the training.

7. The method of claim 1, wherein the pre-configured delay time is set between a 0 value and a maximum delay time value in a section where the training exceeds a predetermined training stage.

8. The method of claim 1, wherein the pre-configured delay time is set between a minimum delay time value and a maximum delay time value in a section where the training exceeds a pre-determined training stage.

9. The method of claim 1, wherein the pre-configured delay time is set to increase up to a delay time of a voice recognizer as a stage of the training advanced.

10. An apparatus for training an artificial intelligence (AI) model, the apparatus comprising:

a processor and a memory, wherein the processor is configured to:

generate first time information on a plurality of words included in a voice and transcription, using a first learning sample including the voice and the transcription;

generate second time information by adding a pre-configured delay time to the first time information;

generate a modified transcription based on an end time of a last word among the plurality of words and the second time information; and perform training of the AI model based on a second training sample including the voice and the modified transcription, wherein the pre-configured delay time is progressively increased in correspondence with an advancement of a stage of the training, and wherein an amount of word removal for generating the modified transcription is increased in response to an increase of the pre-configured delay time.

11. The apparatus of claim 10, wherein the pre-configured delay time is related to a delay time for text output of a voice recognizer.

12. The apparatus of claim 10, wherein the first time information includes information on an end time for each word for the plurality of words.

13. The apparatus of claim 12, wherein the second time information is generated by adding the pre-configured delay time to the end time for each word for the plurality of words.

14. The apparatus of claim 10, wherein the modified transcription is generated by removing one or more words from among the plurality of words whose end time for each word is greater than or equal to the end time based on the second time information.

15. The apparatus of claim 10, wherein the pre-configured delay time is set to a value of 0 in an initial section of the training.

16. The apparatus of claim 10, wherein the pre-configured delay time is set between a 0 value and a maximum delay time value in a section where the training exceeds a pre-determined training stage.

17. The apparatus of claim 10, wherein the pre-configured delay time is set between a minimum delay time value and a maximum delay time value in a section where the training exceeds a pre-determined training stage.

18. The apparatus of claim 10, wherein the pre-configured delay time is set to increase up to a delay time of a voice recognizer as a stage of the training advanced.

19. One or more non-transitory computer readable storage medium storing one or more instructions, wherein the one or more instructions are executed by one or more processors and control an apparatus for training an artificial intelligence (AI) model to:

generate first time information on a plurality of words included in a voice and transcription, using a first learning sample including the voice and the transcription;

generate second time information by adding a pre-configured delay time to the first time information;

generate a modified transcription based on an end time of a last word among the plurality of words and the second time information; and perform training of the AI model based on a second training sample including the voice and the modified transcription, wherein the pre-configured delay time is progressively increased in correspondence with an advancement of a stage of the training, and wherein an amount of word removal for generating the modified transcription is increased in response to an increase of the pre-configured delay time.

20. The computer readable storage medium of claim 19, wherein the pre-configured delay time is related to a delay time for text output of a voice recognizer.

* * * * *